March 1, 1938.  C. HENNEKING  2,109,996
DEVICE FOR TRANSPORTING RAIL VEHICLES ON LAND
Filed Sept. 23, 1936
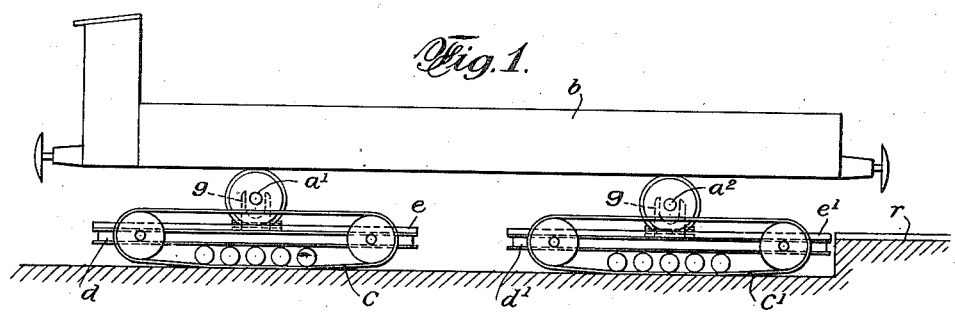
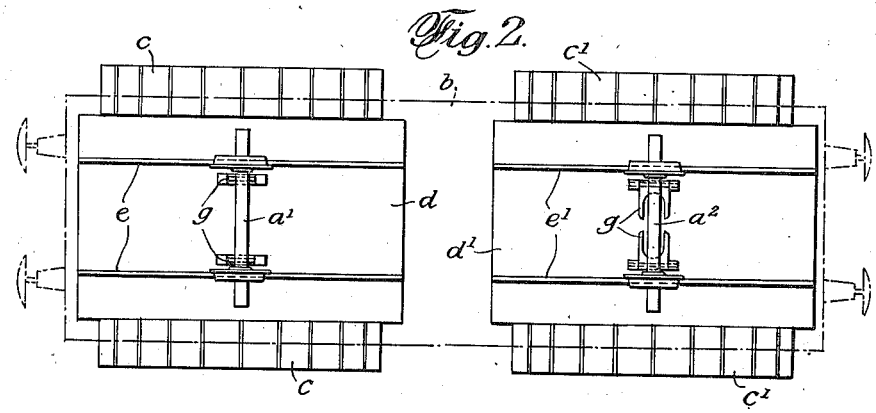
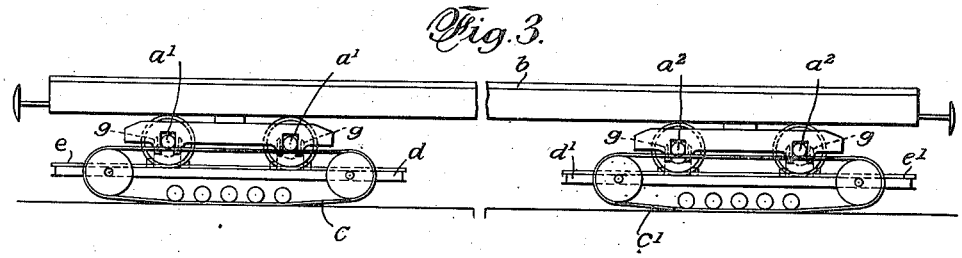
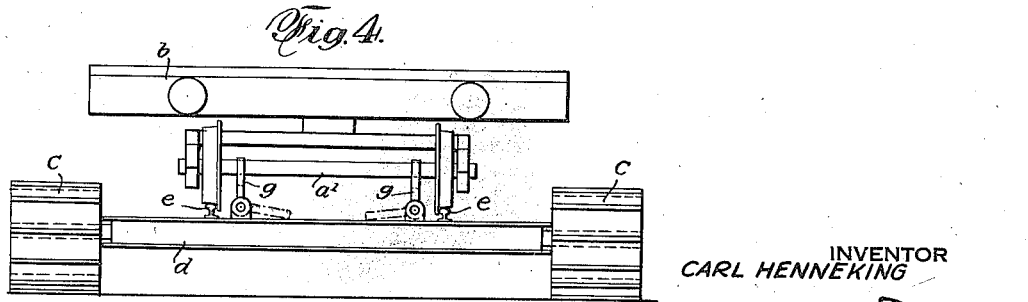
INVENTOR
CARL HENNEKING
BY
ATTORNEY Patented Mar. 1, 1938

2,109,996

UNITED STATES PATENT OFFICE 2,109,996

DEVICE FOR TRANSPORTING RAIL VEHICLES ON LAND

Carl Henneking, Magdeburg, Germany

Application September 23, 1936, Serial No. 102,142
In Germany August 19, 1935

2 Claims. (Cl. 280—80)

The invention relates to an arrangement for transporting rail vehicles, especially loaded and empty railway trucks which have been conveyed on the railway from the end of the railway track to any desired place over roads and open country, the latter being either uncultivated or cultivated land.

It is already known to convey railway waggons on road vehicles. It is likewise known to employ for this purpose low-built chassis each having at least four wheels and each carrying like a trolley an axle or a bogie of a truck. For example railway waggons with two axles are transported by running each axle on to a low chassis, whereupon the axles or wheels are fixed thereon so that the railway waggon can be conveyed on the two supporting chassis on made roads.

The number and construction of the individual wheels of the supporting chassis similar to a trolley are determined on the one hand by the total weight which is composed of the dead weight and the net load of the railway vehicle and the weight of the supporting chassis and on the other hand by the carrying capacity of the road surface. Supporting chassis with a relatively large number of wheels have already been built, these wheels being so dimensioned that they can carry a rail vehicle weighing up to 80 tons (dead weight and net load). Thus, the uses for such vehicles running on rubber-tired wheels appear to be restricted.

The object of the invention is, to extend the possibility of delivering loaded rail vehicles so that these vehicles can be conveyed over unmade and uneven country tracks or even on the open fields, that is on virgin or cultivated land. In this instance the individual loaded wheels of the supporting chassis which carry the individual axle or the individual bogie of the railway waggon will sink into the insufficiently firm subsoil of the ground, whereby the transport of the railway waggon is rendered very difficult or even made impossible. In the case of considerable unevenness of the ground, some of the wheels would hang in the air, whereas others would be correspondingly overloaded.

In order to overcome this objection it is proposed according to the invention, to equip each supporting chassis which carries an axle or a bogie of the railway waggon with endless tracks of known construction, instead of with wheels. By employing ground plates fitted in the endless tracks, the surface pressure can be reduced to 1 kilogramme per square centimetre or even less, so that in any case an inadmissibly heavy stressing of the ground is avoided and it is possible to convey the railway waggon over open country. In exceptional cases, these supporting chassis may be equipped with wheels as well as with endless tracks.

In these instances similarly constructed, low-built chassis provided with endless tracks are therefore employed in a similar way as the trolleys, which are destined to each one carry one axle or one bogie. This presents the advantage that these endless track vehicles can be similarly constructed and can be rendered independent of the length of the railway waggon.

The supporting chassis consequently comprise a platform supported on endless tracks which are separately or jointly controlled. The platform is provided with rails, on which the railway waggon axle is to be run and further devices for fixing this axle or the wheels of the same. When transporting a railway waggon in open country, the tractive force exerted by the tractor is transmitted from the platform of the first chassis to the front axle of the railway waggon, from this axle to the rear axle and finally to the second chassis. The fixing of the axle or of the wheels is therefore effected in a manner similar to that usually employed on trolleys in railway service, for example by gripping the axle with the aid of swing forks.

An embodiment of the invention is illustrated by way of example in the accompanying drawing, in which:—

Fig. 1 shows the arrangement in side elevation.

Fig. 2 is a top plan view of Fig. 1.

Fig. 3 is a side elevation showing the supporting arrangement with a truck with long axle base.

Fig. 4 is an end view of the transporting device embodying the invention according to Fig. 3.

In Figs. 1 and 2 the axles $a^1$ and $a^2$ of the truck $b$ rest each on a platform $d$ and $d^1$ respectively. These platforms are provided with tracks $e$, $e^1$ so that the railway waggon can be run on to the platforms for example from a ramp $r$. Each platform is supported by endless tracks $c$, $c^1$ respectively which are individually or jointly controlled. Arrangements, such as swing forks $g$ are provided on each platform for fixing the axles or wheels. These forks, as is usual in trolley service, are swung down before the railway waggon is run on to the platform. When the waggon is in the correct position, the forks are swung upwards and locked so that the tractive force is transmitted from the tractor by the forks to the axle on one chassis and then to the axle on the second chassis.

Fig. 3 shows the employment of the supporting chassis for railway waggons with long axle base, such as serve, for example, for transporting timber, iron girders or rails.

In this instance a supporting chassis is placed under each bogie of the long railway waggon and shows that rail vehicles of any length can be conveyed with at least two supporting chassis of uniform construction.

From the foregoing description and drawing it can be readily seen that there has been provided a device capable of transporting on any desired terrain a railway vehicle which device includes a chassis for facilitating the support of the vehicle, the chassis having a rigid platform on the top of which is directly and rigidly secured a pair of spaced apart rails to receive a portion of the railway vehicle directly from a loading ramp, each rail extending continuously and integrally throughout the length of the platform.

The chassis is carried by rotatable endless tracks having main wheel-carrying axles attached directly to the platform which as clearly shown in Figs. 1 and 3 of the drawing are disposed substantially midway of the depth of said platform, the tracks being arranged laterally and externally of the platform.

I claim:—

1. A transportation device for use on any desired terrain, comprising in combination a chassis for facilitating support of a portion of a vehicle, said chassis including a rigid platform, a pair of spaced apart rails rigidly secured directly on said platform and coextensive in length therewith, and rotatable endless tracks carrying said chassis and having main wheel carrying axles attached directly to the platform substantially midway of the depth thereof, said tracks being arranged laterally and externally of said platform.

2. A device for transporting on any desired terrain a railway vehicle, comprising in combination a chassis for facilitating support of said vehicle, said chassis including a rigid platform, a pair of spaced apart rails rigidly secured directly on the top of said platform and each rail extending continuously and integrally throughout the length thereof, said rails being adapted to receive thereon a multi-wheeled portion of a railway vehicle directly from a loading ramp and being adapted to be disposed substantially in alignment with the ramp, means on said platform for fixing the vehicle portion against linear movement relative thereto, and rotatable endless tracks carrying said chassis and having main wheel-carrying axles attached directly to the platform substantially midway of the depth thereof, said tracks being arranged laterally and externally of said platform.

CARL HENNEKING.